Figure 2:
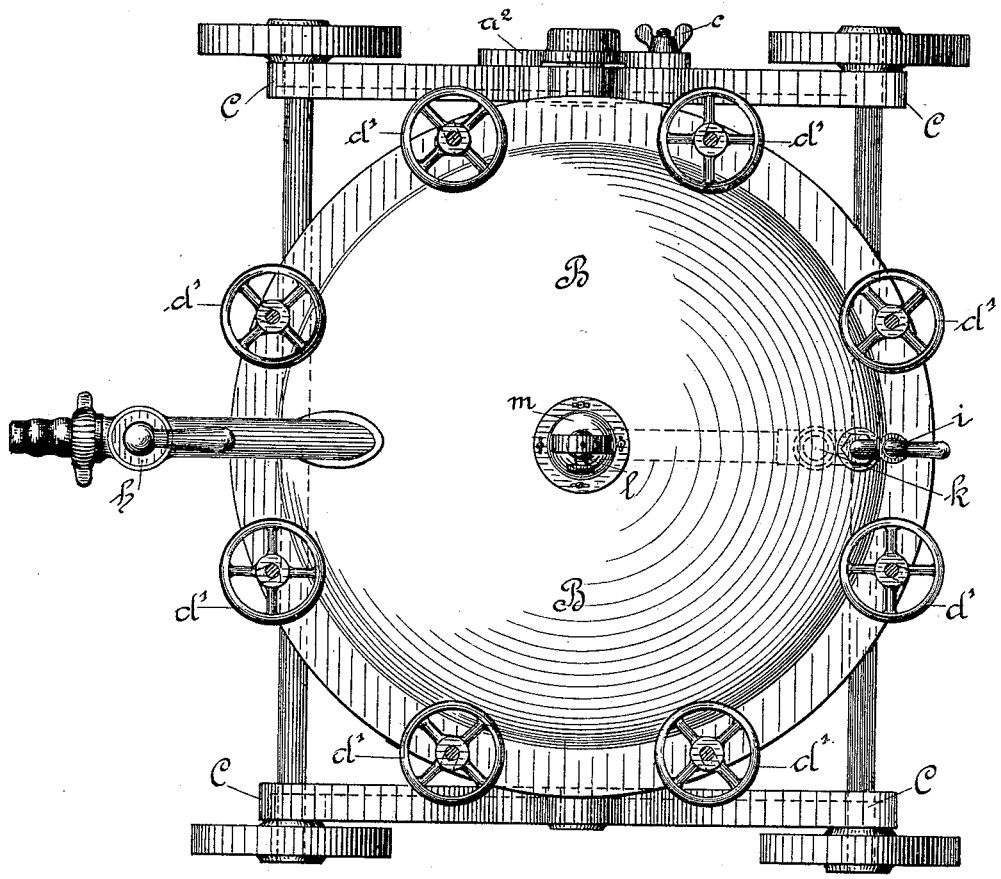

(No Model.) 2 Sheets—Sheet 1.
J. HORNUNG.
FILTERING APPARATUS FOR BEER OR WINE.
No. 499,833. Patented June 20, 1893.
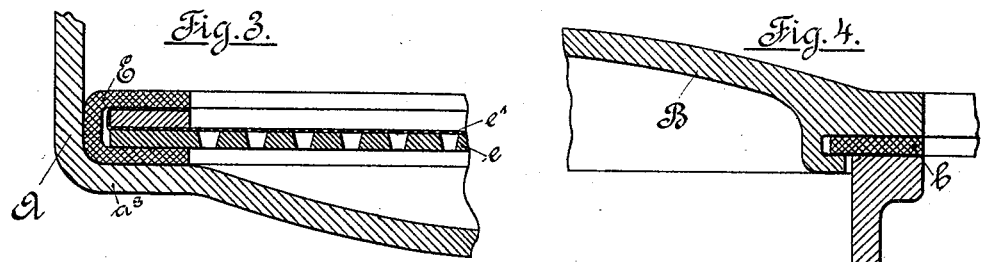
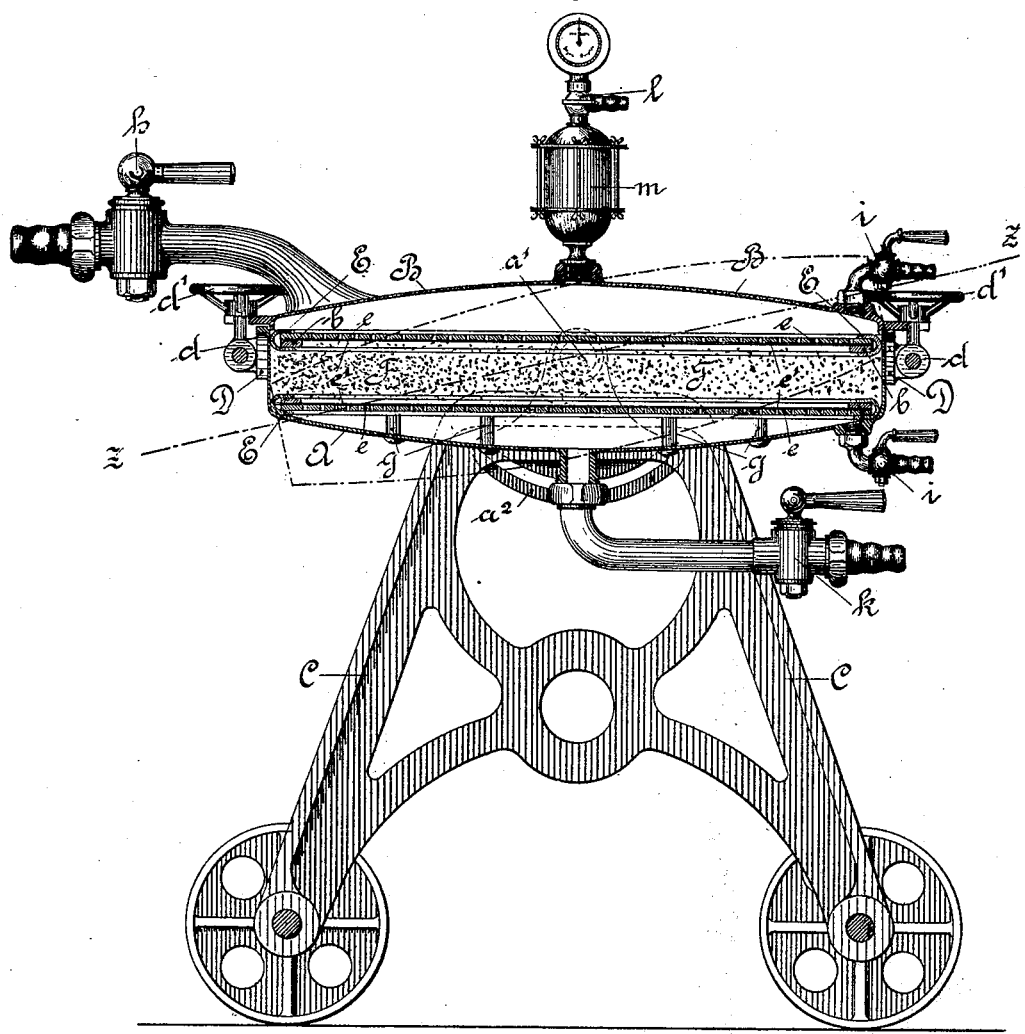
Witnesses:
E. B. Clark
D. P. Cowl
Inventor:
Johannes Hornung,
by Max Hengü
his Attorney.

(No Model.) 2 Sheets—Sheet 2.
J. HORNUNG.
FILTERING APPARATUS FOR BEER OR WINE.

No. 499,833. Patented June 20, 1893.

Witnesses:
E. B. Clark
D. P. Cowl

Inventor:
Johannes Hornung
by Max Georgii
his Attorney.

UNITED STATES PATENT OFFICE.

JOHANNES HORNUNG, OF PLOCHINGEN, GERMANY.

FILTERING APPARATUS FOR BEER OR WINE.

SPECIFICATION forming part of Letters Patent No. 499,833, dated June 20, 1893.

Application filed September 24, 1891. Serial No. 406,753. (No model.)

*To all whom it may concern:*

Be it known that I, JOHANNES HORNUNG, a subject of the King of Würtemberg, residing at Plochingen, Würtemberg, in the German Empire, have invented new and useful Improvements in Filtering Apparatus for Beer or Wine, of which the following is a specification.

The object of my present invention described in detail below is to remove the defects attending in a greater or less degree the filtering apparatus heretofore employed and at the same time to produce a filter which operates excellently at the very low pressure of from one-fourth to one-third of an atmosphere and in which the complete filtering device is introduced into the apparatus in from three to four minutes to permit the latter to be closed.

One of the main objections to most of the existing filtering apparatus is that in transferring the filtering apparatus the same must first be filled with water to expel the air, the beer being then let into the receiver under strong pressure. The same is of course, mixed with the water and is only drawn off from the filter in a pure condition after the said water has been entirely expelled. The mixture of beer and water is manifestly of low value or valueless.

Another very material objection is the fact that in all former filters flannel-cloths have been employed for the diaphragms. These flannels soon become the carriers of bacteria, stale yeast, &c., which cannot be effectively removed therefrom, inasmuch as the only practicable method of washing them in boiling water will cause them to become felted and thereby prevent the percolation of the beer.

A third objection, occurring in many and among them some of the modern filtering appliances, is due to the fact that the filtering substance must be first strongly compressed in order to be so strong as not to collapse, e. g., in vertically arranged filters. The result of thus compressing the filter is the necessity of applying a very high pressure (two-thirds to one atmosphere) to filter the beer. This pressure very often results in a frequent bursting of the barrels, and a consequent great damage to the beer and barrel-material and the impossibility of using the older barrels. Effervescent beer can be filtered in such filters only with extreme difficulty or not at all in many cases.

A further objection is in the fact that the residual beer remaining at the end of the filtering operation can only be utilized as "rest beer" or beer of low grade.

These objections are entirely removed by my novel filtering apparatus in connection with my improved filter.

In the accompanying drawings Figures 1 and 2 represent a vertical section and a plan, respectively, of my apparatus, while Figs. 3 and 4 represent detail-views of the filter and lid-packing.

The filtering vessel, A, here shown as of a circular cross-section, is supported on the frame, C, here shown as provided with a truck, by two diametrically disposed gudgeons, $a'$, adapted to turn in two bearings in the frame. The filtering vessel may be retained in a horizontal or a desired inclined position by a disk-segment, $a^2$, attached to one of the gudgeons, and a thumb-screw, $c$, attached to the frame, C, and whose bolt passes through the slot of the segment, $a^2$. The joint between the top of the vessel, A, and the lid, B, of the filtering vessel is sealed or packed in the usual manner by the hinged screws, $d$, and screw-threaded hand-wheels $d'$, and the interposed rubber-ring, $b$, held to the lid by a projecting flange. The gudgeons, $a'$, and the pivots for the hinged-screws, $d$, are secured to a wrought-iron ring, D, which embraces the sides of the filtering vessel, A, constituting a carrier for the same and its adjuncts.

The filtering material, F, is supported from below by the circular foraminated bottom, $e$, which is connected with the superimposed, finely-meshed wire gauze, $e'$, by a rubber-ring, E, of U-shaped cross-section which clasps the two and rests upon the annular flat portion, $a^3$, of about two centimeters breadth of the arched bottom of the vessel, A, and which constitutes a packing or seal by reason of the pressure arising during the filtering operation. To prevent the bending of the bottom, $e$, the same is sustained by a series of bolts, $g$, secured to the bottom of the vessel, A. The filtering material, F, is covered with another foraminated diaphragm, $e$, covered with wire-gauze, $e'$, and connected by a rubber rim, E. This cover is provided for the purpose of preventing the access to the filtering material of coarse impurities such as resin, &c., and to effect a uniformly distributed supply of the liquid to be filtered to the filter.

Two air-exhaust-cocks, i, i, are attached to the lid, B, and the bottom of vessel, A, opposite to the beer supply-cock, h, and in such a manner that the air-cocks occupy the highest position of the inner space of the vessel when the latter is inclined. The filtered beer is drawn off by the exhaust-cock, k, arranged at the lowest point of the vessel, A.

On the lid, B, is arranged the air and foam-collector, m, having an air-cock, l, by which compressed air may be introduced into the top of the apparatus.

The filtering apparatus operates as follows: The lower foraminated diaphragm, e, having been introduced into the filter-receptacle or vessel, A, by means of rings on the same, the filtering material, F, is evenly spread over the same in a moist condition, and the upper foraminated diaphragm placed on top of the same, whereupon the lid, B, is tightly clamped by means of the hinged screws, d. The cocks, h, i, i, are then closed, while, k, and l are opened to introduce compressed air through the latter to expel the water contained in the freshly introduced filtering-material, which water flows off through cock, k. The cock, l, is then closed, the entire filtering receptacle tilted so as to occupy an inclined position, Z Z, and the beer-supply-cock opened, while, at the same time, the cocks, k, and i, are also opened, the latter remaining open until the beer begins to flow from the same, a sign that all the air has been expelled from the interior of the apparatus. The cocks, i, i, are now closed, the apparatus brought into its usual horizontal position and the filtering proper commenced. For this purpose, a pressure of about one-fourth to one-third of an atmosphere is entirely sufficient, inasmuch as the loosely filled and only slightly compressed filtering-mass allows the beer to readily pass through, a perfectly pure filtration being the result. When the filtration of one barrel is complete the beer outlet at the bottom of the receptacle may be closed to keep the filter filled, or it may be opened and the filter completely drained. By applying air pressure to the barrel being emptied, the last remnant of the beer may be driven through the filter and into the transfer barrel.

When, in exceptional cases, it is desired to empty the filtering apparatus and force the beer out of the filter, before the supply barrel has been fully emptied, the beer-supply-cock, h, is closed and the air-cock, l, provided with a compressed air-hose is opened and compressed air introduced, and thereby the last residuum of beer expelled from the apparatus. No residual beer is hence produced either at the beginning or the end of the operation and the apparatus accordingly is very economical in operation.

The cleaning of the foraminated diaphragms and the wire-gauze cover is performed very rapidly, resulting in considerable saving in working expenses.

To briefly summarize the advantages of my filtering apparatus they consist in the following: first, automatic packing of the filter and a consequent rapid and simple manipulation of the apparatus; second, slight pressure, (one-fourth to one-third of an atmosphere;) third, the absence of residual beer and the elimination of flannel, the collector of all the yeast and bacteria.

I claim—

In a filtering apparatus, the combination, with a frame having bearings, a disk-shaped receptacle having a downward-arched bottom provided with an annular flat portion near its upper edge, a series of gudgeons secured to the side of the receptacle and journaled in the bearings, a lower foraminated diaphragm, a lower screen, a lower U-shaped packing ring surrounding the peripheries of both the lower diaphragm and the screen and resting on the annular flat portion of the bottom, a layer of filtering material above the lower diaphragm and screen, an upper foraminated diaphragm and screen, an elastic U-shaped packing ring surrounding the peripheries of both the upper diaphragm and screen and resting on the filtering material, a top removably secured to the receptacle above the upper diaphragm and screen, an inlet-pipe inserted in the top of the receptacle, an outlet-pipe connected to the bottom of the receptacle, a compressed air inlet connected to the top of the receptacle, and a series of air-outlet cocks connected to the side of the receptacle, one above the upper diaphragm, and one below the lower diaphragm, substantially as described and for the purpose set forth.

In testimony whereof I have signed this specification in the presence of two subscribing witnesses.

JOHANNES HORNUNG.

Witnesses:
AUGUST B. DRAUTZ,
CARL DUSSMAUN.